US012532278B2

(12) United States Patent
Galeev et al.

(10) Patent No.: US 12,532,278 B2
(45) Date of Patent: Jan. 20, 2026

(54) METHODS AND APPARATUS TO PROVIDE PERFORMANCE MEASUREMENTS IN TIME-SENSITIVE NETWORKS

(71) Applicant: Intel Corporation, Santa Clara, CA (US)

(72) Inventors: Mikhail Galeev, Beaverton, OH (US); Susruth Sudhakaran, Beaverton, OR (US); Dave Cavalcanti, Portland, OR (US); Javier Perez-Ramirez, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 17/711,828

(22) Filed: Apr. 1, 2022

(65) Prior Publication Data

US 2022/0225253 A1    Jul. 14, 2022

(51) Int. Cl.
*H04W 56/00* (2009.01)
*H04J 3/06* (2006.01)
*H04L 1/00* (2006.01)
*H04L 5/00* (2006.01)
*H04W 24/10* (2009.01)

(52) U.S. Cl.
CPC ......... *H04W 56/004* (2013.01); *H04J 3/0667* (2013.01); *H04L 1/0026* (2013.01); *H04L 1/0061* (2013.01); *H04L 5/0053* (2013.01); *H04W 24/10* (2013.01); *H04W 56/001* (2013.01)

(58) Field of Classification Search
CPC .... H04J 3/0667; H04L 1/0026; H04L 1/0061; H04L 5/0053; H04W 24/10; H04W 56/001
See application file for complete search history.

(56) References Cited

U.S. PATENT DOCUMENTS

| | | | |
|---|---|---|---|
| 2018/0309656 A1* | 10/2018 | Regev | G06F 11/273 |
| 2020/0022175 A1* | 1/2020 | Xiong | H04L 5/001 |
| 2020/0213022 A1* | 7/2020 | Götz | H04J 3/0697 |
| 2020/0267673 A1* | 8/2020 | Joseph | H04W 56/001 |
| 2021/0120552 A1 | 4/2021 | Fang et al. | |
| 2021/0204172 A1* | 7/2021 | Rost | H04L 43/026 |
| 2021/0218686 A1 | 7/2021 | Galeev et al. | |
| 2022/0014529 A1 | 1/2022 | Juliato et al. | |
| 2022/0014532 A1 | 1/2022 | Perez-Ramirez et al. | |

(Continued)

OTHER PUBLICATIONS

"IEEE Standard for Information Technology—Telecommunications and information exchange between systems—Part 11: Wireless LAN Medium Access Control (MAC) and Physical Layer (PHY) Specifications, Amendment 1: Radio Resource Measurement of Wireless LANs" IEEE 802.11k™-2008, New York, NY, Jun. 12, 2008, 244 pages.

(Continued)

*Primary Examiner* — Deepa Belur
(74) *Attorney, Agent, or Firm* — Hanley, Flight & Zimmerman, LLC

(57) ABSTRACT

Disclosed examples determine a first time corresponding to a start of a window for a data exchange; determine a second time corresponding to a data packet sent during the window; calculate link performance data based on the first time and the second time; and transmit the link performance data to a network configuration entity.

25 Claims, 12 Drawing Sheets

(56) References Cited

U.S. PATENT DOCUMENTS

| | | | | |
|---|---|---|---|---|
| 2022/0086100 A1* | 3/2022 | Biederman | ............. | H04L 47/56 |
| 2022/0217051 A1* | 7/2022 | Zhang | ................. | H04L 43/0858 |
| 2022/0224653 A1* | 7/2022 | Chen | ...................... | H04L 47/56 |
| 2022/0322257 A1* | 10/2022 | Moon | ................. | H04W 56/001 |
| 2023/0232353 A1* | 7/2023 | Oga | ................... | H04W 56/003 |
| | | | | 370/329 |
| 2023/0388215 A1* | 11/2023 | Wang | ...................... | H04L 45/30 |
| 2024/0129247 A1* | 4/2024 | Gogolev | .............. | H04L 47/245 |

OTHER PUBLICATIONS

"IEEE Standards Association, IEEE Standard for Information Technology—Telecommunications and information exchange between systems Local and metropolitan area networks- Specific requirements" Part 11: Wireless LAN Medium Access Control (MAC) and Physical Layer (PHY) specifications, Amendment 8: IEEE 802.11 Wireless Network Management, 802.11v™-2011, New York, NY, Feb. 9, 2011, 433 pages.

Avnu, "Avnu Alliance: Wireless TSN—Definitions, Use Cases & Standards Roadmap White Paper" AVNU.com, published on Mar. 17, 2022, 2 pages [retrieved from: https://web.archive.org/web/20220317031118/https://avnu.org/ wireless-tsn-paper/ on Apr. 1, 2022].

* cited by examiner

METHODS AND APPARATUS TO PROVIDE PERFORMANCE MEASUREMENTS IN TIME-SENSITIVE NETWORKS

FIELD OF THE DISCLOSURE

This disclosure relates generally to communication networks and, more particularly, to methods and apparatus to provide performance measurements in time-sensitive networks.

BACKGROUND

Time-sensitive networking (TSN) is a set of protocols developed by a working group of the Institute of Electrical and Electronics Engineers (IEEE) 802.1, 802.1Qcc, etc. TSN protocols may be implemented in a network of devices (e.g., end-devices, stations (STAs), access points (APs), bridges, servers, etc.) to be able to exchange data between the devices. For example, TSN protocols may be used in conjunction with edge networks, wireless networks (e.g., Wi-Fi, fifth generation (5G) cellular networks, etc.), and/or wired networks (e.g., Ethernet). TSN protocols may be used for any type of device-to-device communication including real-time gaming, industrial control systems, etc.

BRIEF DESCRIPTION OF THE DRAWINGS

In general, the same reference numbers will be used throughout the drawing(s) and accompanying written description to refer to the same or like parts. The figures are not to scale.

Figure 1:
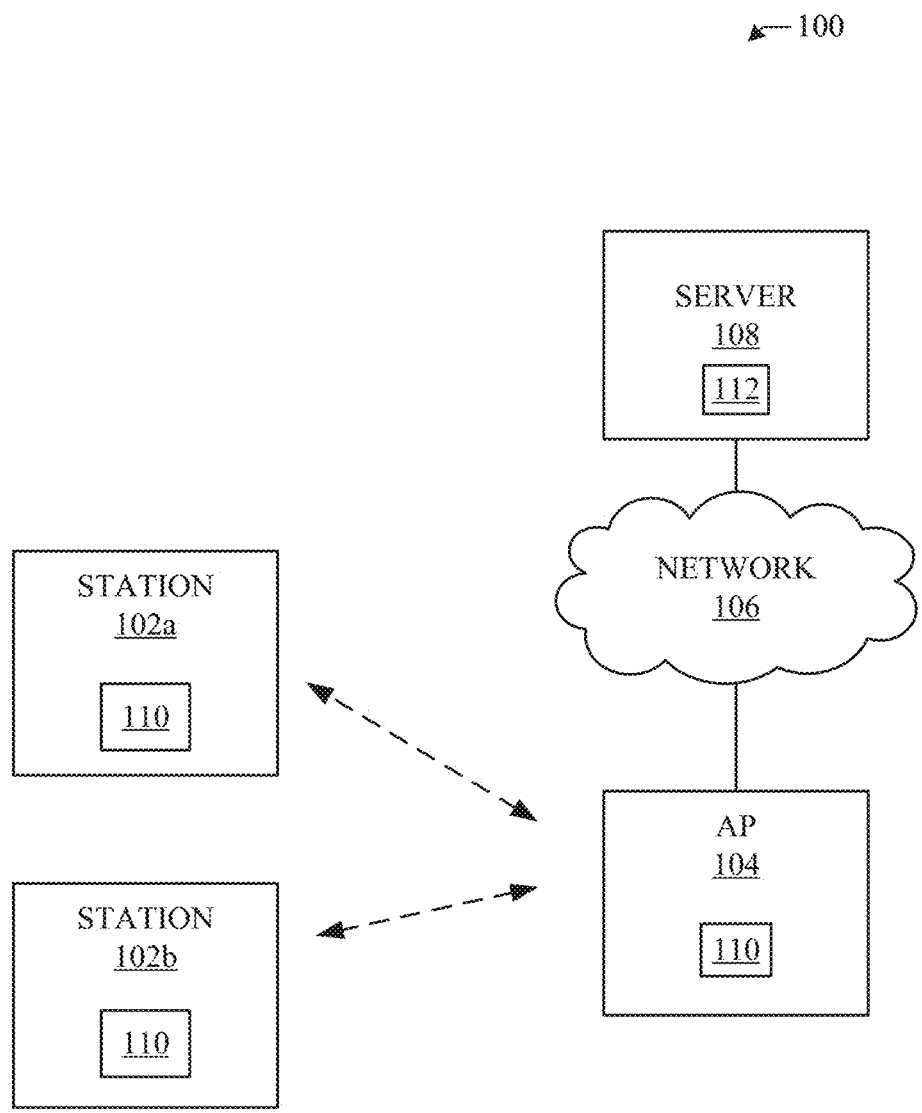
FIG. 1 is an example time-sensitive network environment to provide performance measurements in time-sensitive networks.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As described above, TSN protocols may be implemented in a network of devices (e.g., TSN nodes such as end-devices, stations, access points, bridges, servers, etc.) to be able to exchange data between the devices. In a centralized TSN management model (e.g., corresponding to 802.11Qcc), communications in the TSN domain (e.g., either wired or wireless) are scheduled with a high degree of reliability. TSN end devices (e.g., stations, talkers, listeners, etc.) as well as network elements (e.g., bridges, access points (APs), client devices, etc.) operate according to a global time-aware schedule device by a central network configuration (CNC) entity. A global time-aware schedule (also referred to as global schedule) is a schedule that is known by all devices operating in a network prior to implementation of the schedule.

Each device of the network exchanges data according to the global time-aware schedule. For example, if a first station (e.g., a transmitting device, a talker, etc.) is scheduled to exchange data to a second station (e.g., a receiving device, a listener, etc.) via a link during a particular protected window. The first station transmits a TSN data frame to the second station when the particular protected window occurs. In response to obtaining the TSN data frame, the second station transmits an acknowledgement (ACK) to the first device. In some examples, if the first station does not obtain the ACK within a threshold amount of time, the first station will repeat transmission of the TSN data frame until the ACK is received or the protected window ends. The length of the protected window is a preset amount of time corresponding to a worst case scenario based on prior observation and/or statistical analysis. The preset amount of time ensures, within some percentage of assurance, that the TSN data frame will be obtained by the listener and the ACK within the protected window.

Traditional network elements and devices do not have a mechanism to measure wireless link performance (e.g., also referred to as key performance indicators) related specifically to TSN requirements (e.g., key performance indicators (KPIs) corresponding to time-aware schedule operation). Time-aware wireless link performance is also referred to as time-aware KPIs. Traditional global time-aware scheduling includes a protected window with a length or duration long enough to ensure (e.g., with some percentage of assurance) successful data exchange even with poor channel conditions that may require higher redundancy and/or time for retransmissions. However, such a large, protected window duration is inefficient for good channel conditions with less redundancy or time retransmissions. Further, there is no mechanism in traditional network elements to highlight when the protected window duration is not long enough and/or if/when any other issue occurs in the TSN network.

Examples disclosed herein generate time sensitive-specific KPI metrics that can be used by a scheduling device (e.g., a CNC) to adjust the time-sensitive window based on the performance of components in the time sensitive network. Examples disclosed herein include performing KPI measurements at the talking device (e.g., device transmission data) and the listening device and transmitting the measurements to a CNC. The KPI measurements include a time buffer KPI, a delay time KPI, a queue time measurement KPI, an adjusted time different KPI, a TSN flow transmitted frame control KPI, a TSN flow received frame center KPI, a TSN flow retransmission control KPI, a TSN flow failed transmissions control KPI, a time sync transmitted frame control KPI, a time sync received frame control KPI, a time sync retransmission control KPI, and/or a time sync failed transmission control KPI. Because the CNC can use the time sync information to adjust the TSN window, examples disclosed herein determine the time sync KPIs based on information collected during time sync windows (e.g., window dedicated for time synchronization of clocks of the wireless devices)

The adjusted time difference is an average value and/or histogram of values (e.g., based on a plurality of measurements from one or more devices) of time offsets between a secondary clock of a STA and a primary clock of an AP. The histogram is an array of data to represent a distribution of measured values. However, other techniques for representing a distribution of measured values may be used. The delay time is herein referred to as a transmitting (Tx) delay time (TxDT) and the KPI or link performance measurement at the listening device is herein referred to as a receiving (Rx) delay time (RxDT). The talking station calculates the TxDT by determining the difference between a time of the start of the protected window (TX_Tws) and a time of the transmission of the TSN data frame (Tx_Tstart) (e.g., TxDT=TX_Tws−Tx_Tstart [in microseconds]). The listening station calculates the RxDT by determining the difference between a time of the start of the protected window (RX_Rws) and a time of when the TSN data frame is received (R_Tstart) (e.g., RxDT=RX_Rws−Rx_Tstart [in microseconds]). The delay time KPI may be an average delay time of multiple measurements or a histogram of the multiple measurements. The time buffer is herein referred to as a transmitting (Tx) time buffer (TxTBuf) and a KPI or link performance measurement at the listening device is herein referred to as a receiving (Rx) time buffer (RxTBuf). The talking station calculates the TxTBuf by determining the difference between a time of the end of the protected window (TX_Twe) and a time of when the ACK was obtained (Tx_Tdone) (e.g., TxTBuf=TX_Twe−Tx_Tdone [in microseconds]). The listening station calculates the RxTBuf by determining the difference between a time of the end of the protected window (RX_Rwe) and a time of when the ACK was sent (R_Tdone) (e.g., RxTBuf=RX_Rwe−Rx_Tdone [in microseconds]). The buffer time KPI may be an average buffer time of multiple measurements or a histogram of the multiple measurements. If there is no transmission error, the TxTBuf and the RxTBuf should be similar (e.g., within a threshold amount of time). However, if there is a transmission error or the protected window is not long enough, the TxTBuf may be significantly different than the RxTBuf, the TxTBuf may be 0 (zero) or negative, and/or the RxTBuf may be negative).

The queue time KPI is a measurement corresponding to queue delay (e.g., the amount of time a TSN frame was in a queue before being transmitted, the amount of time the MAC service data unity (MSDU) passed to the MAC until the point at which transmission of the frame begins, etc.). The queue time may be an average of the queue times of multiple packets or a histogram of queue times. Although the queue time relates to the delay time, the delay time may be long due to factors other than the delay time. Accordingly, providing both the delay time and the queue time to the CNC provides different information that can be leveraged to control the TSN window. The TSN flow transmitted frame control KPI is the number of frames that the TSN node successfully transmitted during one or more TSN windows. The TSN flow receive frame control KPI is the number of frames that the TSN node has successfully received during one or more TSN windows. The TSN flow retransmission control KPI is the number of frames which are successfully transmitted after one or more attempts during one or more TSN windows. The TSN flow failed transmissions control KPI is a number of frames that the TSN node failed to transmit after exceeding the retry limits during one or more TSN windows.

The time sync transmitted frame control KPI is the number of frames that the TSN node successfully transmitted during one or more time sync windows. The time sync receive frame control KPI is the number of frames that the TSN node has successfully received during one or more time sync windows. The time sync retransmission control KPI is the number of frames which were successfully transmitted after one or more attempts during one or more time sync windows. The time sync failed transmissions control KPI is a number of frames that the TSN node failed to transmit after exceeding the retry limits during one or more time sync windows.

In examples disclosed herein, any component or node in a TSN network (e.g., a talking device, a listening device, a STA, an AP, a gateway, a bridge, a switch, a server, etc.) can calculate one or more of the KPIs and transmit the KPI measurements to the CNC (e.g., directly or via another node in the TSN network) to dynamically adjust the TSN windows based on the feedback, thereby optimizing the TSN window. In some examples disclosed herein, a component (e.g., an AP) can aggregate multiple KPI measurements from one or more devices in a TSN network and generate a report including the aggregated data. In such examples, STAs can collect and send KPI data to the AP at the MAC level without sending the KPI measurements to a higher level (e.g., the application level). In this manner, the AP can convert the KPI data to a protocol that can be understood by the application level and send the KPI data to the CNC, thereby reducing overhead from the STAs.

Using examples disclosed herein the CNC can process the link performance measurements to generate a report, mitigate transmission errors, and/or adjust the protected window duration to make the network more efficient or to increase performance. Although examples disclosed herein are described in conjunction with the IEEE standard 802.11k and 802.11v, examples disclosed herein may be implemented in conjunction with any standard that corresponds to a global time-aware schedule (e.g., 802.11, 802.1, etc.)

FIG. 1 is an example TSN environment 100 to facilitate data transmission. The example TSN environment 100 includes example stations 102a-102b, an example access point 104, an example network 106, an example server 108, an example data collector 110, and an example central network configuration (CNC) entity 112. Although the example environment 100 is a TSN environment, the example environment 100 may correspond to any environment that utilizes a global time-aware schedule or any environment that includes middleware. Additionally, although the example environment 100 includes two stations 102a, 102b, the AP 104, and the server 108, the environment 100 may include any number of stations connected to any number of APs, bridges, servers, etc. via the network 106. Although examples disclosed herein relate to an environment corresponding to a server, AP, and STA, examples disclosed herein can be implemented in different types of environment. For example, examples disclosed herein may be implemented in an IoT network with IoT devices, gateways, back servers, etc.

The example STAs 102a, 102b of FIG. 1 are TSN and/or Wi-Fi enabled computing devices. The example STAs 102a, 102b may be, for example, computing devices, portable devices, mobile devices, mobile telephones, smart phones, tablets, gaming systems, televisions, sensors, internet of things (IoT) devices or sensors, edge devices, robotic equipment, automotive computers, medical equipment, avionic equipment, and/or any other TSN and/or Wi-Fi enabled device. The example STAs 102a, 102b include the example radio circuitry (e.g., to transmit and/or receive data) and/or other processors (e.g., implementing one or more applications). The example STAs 102a, 102b may include all or part of the example data collector 110, as further described below. In examples disclosed herein, the example STA 102a corresponds to a publisher and/or talker and the example STA 102b corresponds to a subscriber and/or listener. However, either device 102a can be implemented as either a publisher/talker and/or a subscriber/listener.

The example AP 104 of FIG. 1 is a device that allows the example STAs 102a, 102b to access the example network 106 and/or to connect to each other. The example AP 104 may be a router, a modem-router, a bridge, and/or any other device that provides a connection to a network. A router provides a wireless communication link to a STA. The router accesses the network through a wire connection via a modem. A modem-router combines the functionalities of the modem and the router. The example AP 104 may include all or part of the example data collector 110, additional processors (e.g., implementing software), and/or radio circuitry (e.g., to transmit and/or receive data).

The example network 106 of FIG. 1 is a system of interconnected systems exchanging data. The example network 106 may be implemented using any type of public or private network such as, but not limited to, the Internet, a telephone network, a local area network (LAN), a cable network, and/or a wireless network. To enable communication via the network 106, the example AP 104 and/or the server 108 includes a communication interface that enables a connection to an Ethernet, a digital subscriber line (DSL), a telephone line, a coaxial cable, or any wireless connection, etc.

The example server 108 of FIG. 1 is a computing device that may implement all or part of the example CNC entity 112 to monitor link performance, negotiate data streams, adjust communication windows, as further described below.

The example data collector 110 of FIG. 1 (e.g. also referred to as data collection circuitry) is a component that may be implemented in a device that performs a data exchange during a window identified in a global time-aware schedule. The example data collector 110 measures and/or collects TSN-based KPIs and/or link performance information (e.g., data, metrics, etc.). As described above, the TSN KPIs and/or link performance information may include an adjusted time difference, a time buffer KPI, a delay time KPI, a queue time measurement KPI, an adjusted time different KPI, a TSN flow transmitted frame control KPI, a TSN flow received frame center KPI, a TSN flow retransmission control KPI, a TSN flow failed transmissions control KPI, a time sync transmitted frame control KPI, a time sync received frame control KPI, a time sync retransmission control KPI, and a time sync failed transmission control KPI. In some examples, the data collector 110 measures and/or collects a time buffer, time delay, and/or queue time with respect to a time sync window. When the example data collector 110 is implemented in a transmitting device (e.g., a forwarding bridge, the AP 104 and/or the talking STA 102a), the data collector 110 determines a TxTBuf based on the time when an ACK is received (e.g., TxTBuf=TX_Twe−Tx_Tdone [in microseconds]) and determines a TxDT based on the time the window started and the time the data frame was transmitted (e.g., TxDL=Tx_Tws−Tx start). When the example data collector 110 is implemented in a receiving device (e.g., a forwarding bridge, the AP 104, and/or the listening STA 102*b*), the data collector 110 determines a RxTBuf based on the time when the ACK is sent (e.g., RxTBuf=RX_Rwe-Rx_Tdone [in microseconds]) and the RxDT based on the time when the window started (e.g., RxDT=Rx_ws-Rx_start). The example data collector 110 may determine an adjusted time differential based on the time difference between the primary and secondary clocks. The adjusted time differential may be saved locally for other operations as needed. Additionally, the example data collector 110 may determine the queue time based on the amount of time that a data packet was in the queue before it was transmitted. Additionally, the example data collector 110 may determine other TSN and/or time sync information by tracking the counts of various events, as further described below.

In some examples, the example data collector 110 of FIG. 1 may generate a flag indicative of one or more transmission errors when the ACK is not transmitted and/or received within a protected window. For example, the data collector 110 may generate a bit, value, string, message, etc. to indicate a transmission error and include the bit, value, string, message, etc. in the link performance and/or report that is sent to the CNC entity 112. The example data collector 110 transmits the determined KPIs and/or link performance information to the example CNC entity 112 (e.g., directly or via another network component such as the AP 104) using a communication protocol (e.g., NETCONFIG, YANG, etc.). The example data collector 110 may transmit the determined KPI and/or link performance information after every data exchange, after one or more preset numbers of data exchanges, and/or based on a trigger (e.g., when an error has been identified, the CNC entity 112 requests the link performance information, etc.). If the example CNC entity 112 transmits KPI and/or link performance information across multiple windows, the CNC entity 112 may calculate a histogram and/or average of the KPI values and send the histogram and/or average to the CNC entity 112. If the example data collector 110 only transmits link performance information based on a trigger, the data collector 110 may send multiple previous link performance measurements when an error occurs, or may send only the link performance information corresponding to the error. If the example data collector 110 sends only the link performance information corresponding to the error, the data collector 110 may include other contextual information (e.g., an indication of the number of successful data exchanges prior to the error). When implemented in the AP 104, the example data collector 110 may aggregate data from multiple devices (e.g., the example STAs 102*a*, 102*b*) that are in communication with the component. In this manner, the AP 102 can transmit a report based on data across multiple devices to the CNC entity 112. The example data collector 110 is further described below in conjunction with FIG. 2.

The example CNC entity 112 of FIG. 1 is a network configuration entity, system configuration entity, supervising configuration entity, a monitor configuration entity, etc. that processes obtained link performance metrics from talker devices (e.g., STA 102*a*) and listener devices (STA 102*b*). The example CNC entity 112 may process the KPI measurements/link performance metrics to adjust the TSN windows. Additionally or alternatively, the example CNC entity 112 can identify an error or an irregularity if the KPIs do not satisfy one or more thresholds. For example, the example CNC entity 112 may identify an error if the Rx time buffer value is not within a threshold range of the Tx time buffer value (e.g., corresponding to a retransmission and/or a delay in the transmission of the data and/or the ACK). Additionally, the example CNC entity 112 may process the link performance metrics to identify any other irregularity (e.g., when the Tx time buffer or the Rx time buffer is negative, when more than a threshold number of retransmissions occurred, the link performance metrics include, or otherwise identify, an error, etc.). In some examples, the CNC entity 112 generates a jitter measurement based on the obtained link performance metrics. For example, the CNC entity 112 may generate a histogram of the obtained Tx time buffer and/or Rx time buffer information. The example CNC entity 112 may generate a report based on the processed link performance metrics (e.g., including identified errors, irregularities, and/or the jitter histogram). The CNC entity 112 may output the report to a user interface and/or may be used for further statistical analysis at a later point in time. In some examples, the CNC entity 112 may mitigate errors based on the report, the identified errors, and/or the identified irregularities. For example, the CNC entity 112 may adjust the schedule to increase the duration of the protected window when a threshold number of errors or irregularities have been identified (e.g., to increase performance and/or reduce errors). Additionally, the example CNC entity 112 may adjust the schedule to decrease the duration of the protected window based on the KPI measurements and/or when an error or irregularity has not occurred within a threshold amount of time or a threshold number of data exchanges (e.g., to increase efficiency and/or amount of data exchanges). The example CNC entity 112 may be implemented in a single device (e.g., the STA 102*a*, 102*b*, the AP 104, or the server 108) or may be part of a distributed system where parts of the CNC entity 112 are implemented at different devices.

Figure 2:
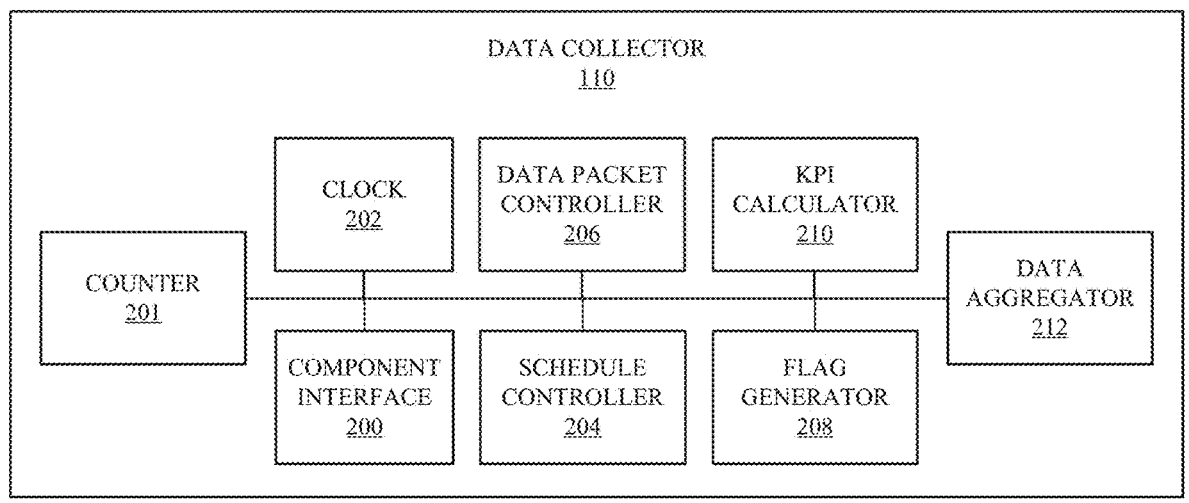
FIG. 2 is a block diagram of an implementation of the example performance measurement collector of FIG. 1.

FIG. 2 is a block diagram of an example implementation of the data collector 110 of FIG. 1. The example data collector 110 includes an example component interface 200, an example counter 201, an example clock 202, an example schedule controller 204, an example data packet controller 206, an example flag generator 208, an example KPI calculator 210, and an example data aggregator 212. In some examples, depending on the TSN node that implements the data collector 110, one or more components may be added or removed. For example, the data collector 110 implemented in a TSN node (e.g., the AP 104) that is in direct communication with multiple devices may include the example data aggregator 212 to aggregate KPI data from multiple devices while a TSN node (e.g., the STA 102*a*, 102*b*) that is in direct communication with a single device may not include the data aggregator 212.

In some examples, the data collector 110 and/or the CNC 112 can be implemented by any device in the environment of FIG. 1. In some examples, the data collector 110 and/or CNC 112 may be virtualized (e.g., implemented in software or a virtual machine). In some examples, components and/or portions of the operations implemented by the data collector 110 and/or CNC 112 may be implemented by other devices in and/or not shown in FIG. 1.

The example component interface 200 of FIG. 2 (e.g., also referred to as component interface circuitry) interfaces with other components of the device that is implementing the data collector 110. For example, the device implementing the data collector 110 may include radio circuitry to transmit and/or receive data packets and/or timing information. Accordingly, the example component interface 200 can obtain data packets received using the radio circuitry and/or instruct (e.g., cause) the radio circuitry to send data packets.

The example counter 201 of FIG. 2 (e.g., also referred to as counter circuitry) tracks counts of one or more events. For example, the counter 201 may track the number of TSN windows that are part of a TSN stream and/or the number of time sync windows that are part of a time sync stream. The example counter 201 may additionally track the number of frames that the TSN node (e.g., the device that implements the data collector 110) has successfully transmitted as part of the TSN stream (e.g., one or more TSN windows) and/or the time sync stream, the number of frames that were successfully received as part of the TSN/time sync stream, the number of frames that failed to transmit within a TSN/time sync window, and/or the number of frames that successfully transmitted after one or more attempts within a TSN/time sync window. The example counter 201 may be a single counter to track the various counts or multiple counters (e.g., one counter for each monitored count).

The example clock 202 of FIG. 2 keeps track of time. The monitored time may be used to determine (a) when a protected window occurs, (b) when an ACK is received, (c) when a ACK is sent, (d) when a data packet is sent, (e) and how long a data packet was stored in a queue. As described above, the timing information is used to determine delay times, and time buffers, queue times.

The example schedule controller 204 of FIG. 2 (e.g., also referred to as schedule controller circuitry) monitors the time of the clock 202 to determine when a protected window for data exchange occurs based on a global time-aware schedule and/or time synchronization. For example, the schedule controller 204 processes the global time-aware schedule to determine which protected windows correspond to a data exchange and when the protected windows occur. The example schedule controller 204 also identifies the end of the protected windows based on the previously obtained global schedule. In the example of FIGS. 1 and/or 2, the global schedule is the communication schedule implemented by the example STAs 102a, 102b, the example AP 104 and/or the example AP 104. In some examples, the schedule controller 204 includes circuitry to access the timing information from the example clock 202 and/or access data corresponding to the global schedule (e.g., from memory or a storage device). In some examples, the schedule controller 204 is code to access the timing information from the example clock 202 and/or access data corresponding to the global schedule (e.g., from memory or a storage device).

The example data packet controller 206 of FIG. 2 (e.g., also referred to as packet controller circuitry) generates data packets. For example, the data packet controller 206 may, when implemented as a talker, generate a TSN and/or time sync data frame and instruct the component interface 200 to transmit the TSN/time sync data frame via the radio circuitry during a protected window. Additionally, the data packet controller 206 may, when implemented as a listener, generate an ACK when a TSN/time sync data frame is received. The data packet controller 206 may also record the time when the ACK was received or sent. In some examples, the data packet controller 206 includes circuitry to (a) generate and/or organize data into a data packet and/or ACK and/or (b) to transmit and/or store generated data based on instructions from another component. In some examples, the data packet controller 206 is code to (a) generate and/or organize data into a data packet and/or ACK and/or (b) to transmit and/or store generated data based on instructions from another component.

The example flag generator 208 of FIG. 2 (e.g., also referred to as flag generation circuitry) generates flags corresponding to data exchange errors. For example, the flag generator 208 may generate a flag (e.g., a bit, value, string, message, register value, etc.) when the ACK and/or the TSN data frame is not obtained within the protected window. The flag (e.g., a bit, value, string, message, register value, etc. indicative of one or more errors) may be provided (e.g., in the link performance data and/or a report) to the example CNC entity 112 to generate a report, mitigate issues, and/or increase efficiency by adjusting the global schedule. In some examples, the flag generator 208 includes circuitry to flag errors. In some examples, the flag generator 208 is code to flag errors.

The example KPI calculator 210 of FIG. 2 (e.g., also referred to as KPI calculation circuitry, link performance calculator, or link performance calculation circuitry) calculates the Tx time buffer and/or the Rx time buffer. As described above, the Tx time buffer and Rx time buffer is representative of link performance. The KPI calculator 210 may include a subtractor to calculate the Tx time buffer by determining a difference between a time of the end of the protected window (TX_Twe) and a time of when the ACK was obtained (Tx_Tdone) (e.g., TxTBuf=TX_Twe−Tx_Tdone [in microseconds]). The example KPI calculator 210 calculates the RxTBuf by determining the difference between a time of the end of the protected window (RX_Rwe) and a time of when the ACK was sent (R_Tdone) (e.g., RxTBuf=RX_Rwe−Rx_Tdone [in microseconds]). The example KPI calculator 210 calculates the TxDT by determining the difference between a time of the start of the protected window (TX_Tws) and a time of the transmission of the TSN data frame (Tx_Tstart) (e.g., TxDT=TX_Tws−Tx_Tstart [in microseconds]). The example KPI calculator 210 calculates the RxDT by determining the difference between a time of the start of the protected window (RX_Rws) and a time of when the TSN data frame is received (R_Tstart) (e.g., RxDT=RX_Rws−Rx_Tstart [in microseconds]). Additionally, the example KPI calculator 210 may, in some examples, determine a percentage or ratio of the TSN and/or time sync counts based on the number of events occurred and the number of windows that occurred. For example, if there was a transmission failure count of 1 during 10 windows, the KPI calculator 210 may determine the transmission failure to be ¹⁄₁₀ or 10%. The example KPI calculator 210 instructs the component interface 200 to transmit the calculated time buffer to the CNC entity 112 using the radio circuitry of the implementing device. In some examples, the KPI calculator 210 includes circuitry to calculate time buffers. In some examples, the KPI calculator 210 is code to calculate time buffers.

The example data aggregator 212 of FIG. 2 aggregates KPI data received from a plurality of TSN nodes. If KPI data is measured locally, the example data aggregator 212 aggregates the local KPI data with received KPI data to generate a report corresponding to multiple TSN nodes in the network. The example data aggregator 212 aggregates data from multiple devices and generates a report that corresponds to a protocol that can be understood by a higher level application. In this manner, the devices that send the KPI measurements to be aggregated can perform the measurements at the MAC level and avoid converting the KI measurements to a protocol at the higher application level. Thus, the devices can transmit the KPI measurements to the device that implements the example data aggregator 212 and the data aggregator 212 can convert the aggregated data to the higher level protocol once (as opposed to multiple times at the multiple device), thereby reducing overhead.

Figure 3A:
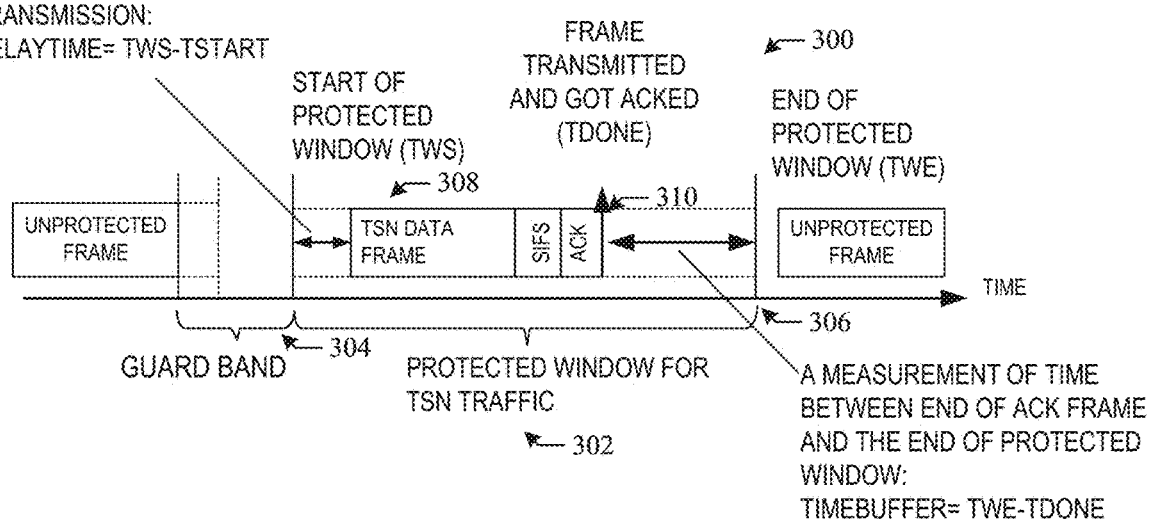
FIG. 3A is an example timing diagram that illustrates an example protected window for time sensitive network data exchange.

FIG. 3A is an example timing diagram 300 that illustrates an example protected window 302 (e.g., a TSN window) for TSN data exchange between a first device (e.g., the example STA 102a) and a second device (the example STA 102b). The example timing diagram 300 includes the example protected window 302, an example protected window start time 304, an example protected window end time 306, an example TSN data frame 308, and an example ACK 310. Although the example of FIG. 3A is described in conjunction with a TSN window, FIG. 3A can be used in conjunction with a time sync window.

As described above, the devices in a TSN network have prior knowledge of the global schedule. Accordingly, shortly after the protected window start time 304, the example data collector 110 of the example STA 102a transmits the TSN data frame 308 to the example STA 102b. The delay time KPI corresponds to the amount of time between the start of the protocol window and the start of the transmission (for the Tx delay time) or the start of reception (for the Rx delay time). After the example STA 102b receives the TSN data frame 308, the data collector 110 of the example STA 102b transmits the example ACK 310. After transmitting the ACK 310, the example STA 102b calculates the Rx time buffer based on a difference between the end of the protected window 306 and the time when the ACK 310 was sent. After the example STA 102a receives the ACK 310, the data collector 110 of the example STA 102a calculates the Tx time buffer based on a difference between the end of the protected window 306 and the time when the ACK 310 was received.

Figure 3B:
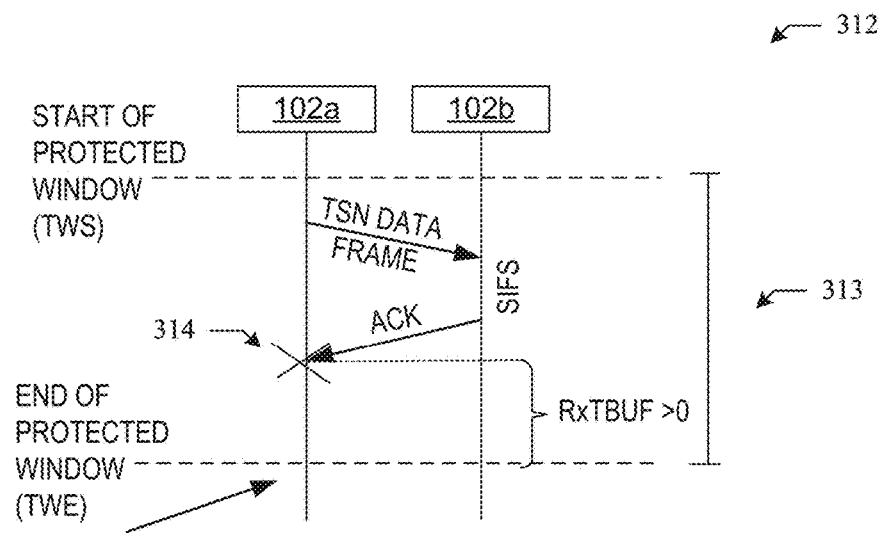
FIG. 3B is an alternative example timing diagram that illustrates an example protected window for a time sensitive network data exchange.

FIG. 3B is an example timing diagram 312 that illustrates an example protected window 313 (e.g., a TSN window) for TSN data exchange between a first device (e.g., the example STA 102a) and a second device (the example STA 102b). The example timing diagram 312 includes a failed ACK 314. Although the example of FIG. 3B is described in conjunction with a TSN window, FIG. 3B can be used in conjunction with a time sync window.

As shown in the example timing diagram 312 of FIG. 3, the example STA 102a transmits a TSN data frame and the example STA 102b transmits an ACK in response to obtaining the data frame. However, the STA 102a never receives the ACK. In the illustrated example of FIG. 3, because the STA 102a does not retransmit the TSN data frame, the data collector 110 of the STA 102a will timeout the time corresponding to the time when the ACK was received, because the ACK was never received. In this manner, the Tx time buffer will end up being 0 (zero) or a negative number. The Rx time buffer will still be positive because the ACK was sent. If the example STA 102a was able to retransmit the TSN data frame, it is possible that the STA 102a will obtain a ACK after the end of the protected frame, thereby resulting in a negative Tx time buffer. In such examples, the data collector 110 of the STA 102a may transmit the negative Tx time buffer with an indication that the ACK was received (or a lack of an indication that the ACK was not received).

While an example manner of implementing the data collector 110 of FIG. 1 is illustrated in FIG. 2, one or more of the elements, processes and/or devices illustrated in FIG. 2 may be combined, divided, re-arranged, omitted, eliminated and/or implemented in any other way. Further, the example component interface 200, the example counter 201, the example clock 202, the example schedule controller 204, the example data packet controller 206, the example flag generator 208, the example KPI calculator 210, the example data aggregator 212, and/or, more generally, the example data collector 110 of FIG. 2 may be implemented by hardware, software, firmware and/or any combination of hardware alone or by hardware in combination with software and/or firmware. Thus, for example, any of the example component interface 200, the example clock 202, the example schedule controller 204, the example data packet controller 206, the example flag generator 208, the example KPI calculator 210, the example data aggregator 212, and/or, more generally, the example data collector 110 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). Further still, the example data collector 110 of FIG. 2 may include one or more elements, processes and/or devices in addition to, or instead of, those illustrated in FIG. 2 and/or may include more than one of any or all of the illustrated elements, processes, and devices.

Figure 4A:
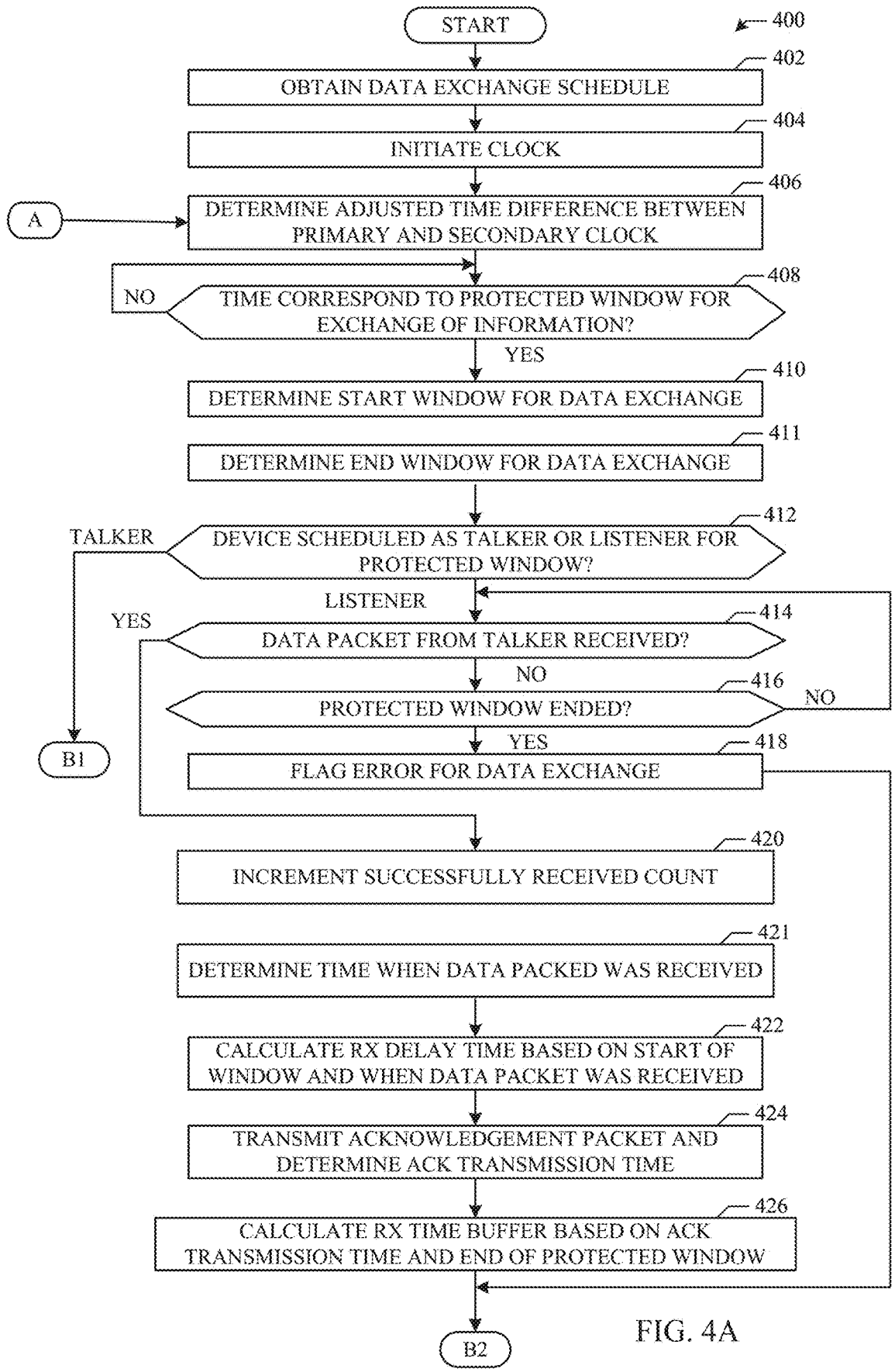
FIGS. 4A-4C illustrate a flowchart representative of machine readable instructions which may be executed to implement the example data collector of FIG. 2.
Figure 4B:
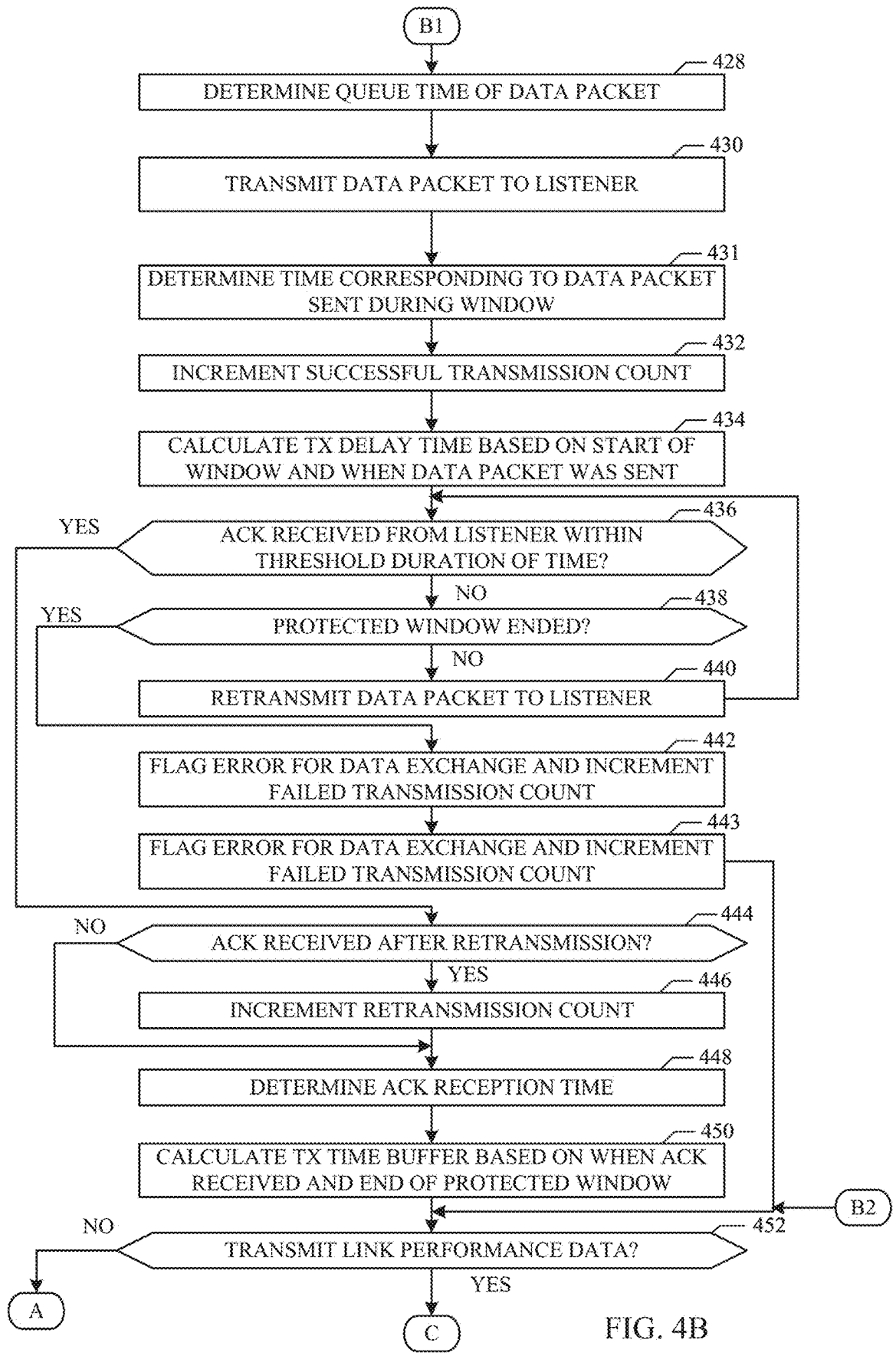
Figure 4C:
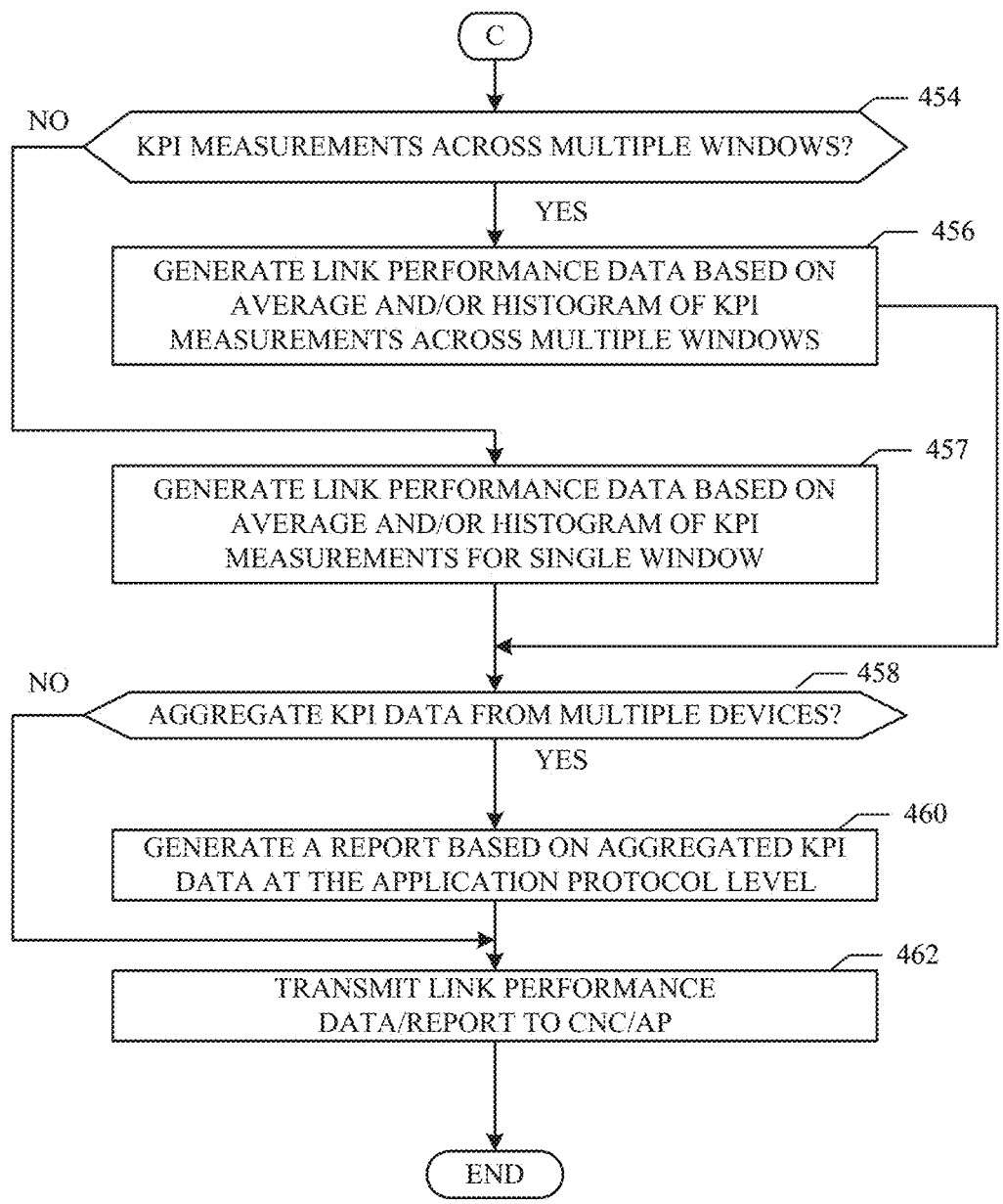

A flowchart representative of example hardware logic, machine readable instructions, hardware implemented state machines, and/or any combination thereof for implementing the example data collector 110 is shown in FIGS. 4A-4C. The machine readable instructions may be one or more executable programs or portion(s) of an executable program for execution by a computer processor and/or processor circuitry, such as the processor 612 shown in the example processor platform 610 discussed below in connection with FIG. 6. The program may be embodied in software stored on a non-transitory computer readable storage medium such as a compact disk (CD), a floppy disk, a hard drive disk (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4A-4C, many other methods of implementing the example data collector 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4A-4C may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 4A-4C illustrate an example flowchart representative of example machine readable instructions 400 that may be executed by the example data collector 110 of FIG. 2 (e.g., implemented in any one of the example STA 102a, 102b, the example AP 104, a bridge, and/or any other device that participates in a data exchange) to collect link performance information (e.g., metrics). Although the flowchart of FIGS. 4A-4C is described in conjunction with the example data collector 110 of FIG. 2 in the environment 100 of FIG. 1, the instructions may be executed by any data collected in any environment. Additionally, although the example instructions 400 are described in conjunction with a TSN window, the instructions 400 may be described in conjunction with a time sync window.

At block 402, the example component interface 200 (FIG. 2) obtains the data exchange schedule from the CNC entity 112 (FIG. 1) via radio circuitry of the device that implements the data collector 110. In the example of FIGS. 4A-4C, data exchange schedule is a global schedule that is known by all devices participating in the network. For example, the global schedule includes the protected windows where particular devices (e.g., defined in the global schedule) can exchange data. At block 404, the example clock 202 (FIG. 2) is initiated so that the schedule controller 204 (FIG. 2) can determine when the particular window corresponding to a data exchange for the implementing device occurs based on the clock and the schedule. At block 406, the example KPI calculator 210 (FIG. 2) determines an adjusted time difference between the primary clock (e.g., of the AP 104) and the secondary clock (e.g., of the STA 102a, 102b). For example, the KPI calculator 210 may determine the adjusted time difference using protocol exchanges (e.g., IEEE 1588 and/or IEE 802.1AS) to determine the instant difference between a local clock of a STA and a primary clock of an AP and use the information to adjust the local clock.

At block 408, the example schedule controller 204 determines if the current time corresponds to a protected window for an exchange of information based on the clock 202. If the example schedule controller 204 determines that the current time does not correspond to the protected window (block 408: NO), control returns to block 408 until the time corresponding to the protected window occurs. If the example schedule controller 204 determines that the current time corresponds to the protected window (block 408: YES), the example schedule controller 204 determines a time corresponding to the start time of the protected window based on the data exchange schedule (block 410) and the schedule controller 204 determines the end time of the protected window based on the data exchange schedule (block 410).

At block 412, the example schedule controller 204 determines if the implementing device (e.g., the device that is implementing the data collector 110) is scheduled as the talker or lister for the protected window. If the example schedule controller 204 determines that the implementing device is scheduled as the talker (block 412: TALKER), control continues to block 428 of FIG. 4B, as further described below. If the example schedule controller 204 determines that the implementing device is scheduled as the listener (block 412: LISTENER), the example data packet controller 206 (FIG. 2) determines if a data packet from the talking device was received by the radio circuitry of the implementing device (block 414).

If the example data packet controller 206 determines that the data packet from the talking device was not received by the radio circuitry of the implementing device (block 414: NO), the example schedule controller 204 determines if the protected window has ended (e.g., based on the schedule and the clock 202) (block 416). If the example schedule controller 204 determines that the protected window has not ended (block 416: NO), control returns to block 414. If the example schedule controller 204 determines that the protected window has ended (block 416: YES), the example flag generator 208 flags an error for the data exchange (block 418) and control continues to block 452 of FIG. 4B. For example, the flag generator 208 may generate a flag (e.g., a bit, value, string, message, register value, etc.) that can be included in performance data and/or a report to indicate that the error.

If the example data packet controller 206 determines that the data packet from the talking device was received by the radio circuitry of the implementing device (block 414: YES), the example counter 201 (FIG. 2) increments the successfully received count (block 420), and the example KPI calculator 210 determines the time when the data packet was received (e.g., using the example clock 202) (block 421). At block 422, the example KPI calculator 210 calculates the RX delay based on the start of the window and when the data packet was received. For example, the KPI calculator 210 determines a difference in time between the start of the window and when the data packet was received using the example clock 202. At block 424, the example data packet controller 206 instructs the radio circuitry of the implementing device (e.g., via the component interface 200) to transmit an ACK packet and determines the ACK transmission time using the example clock 202. At block 426, the example KPI calculator 210 calculates the Rx timer buffer based on the ACK transmission time and the end of the protected window (e.g., RxTBuf=RX_Rwe−Rx_Tdone).

At block 428 of FIG. 4B, the example KPI calculator 210 determines the queue time of the data packet. For example, the KPI calculator 210 uses the example clock 202 to determine how long a data packet was stored in a queue prior to being transmitted. At block 430, the example data packet controller 206 transmits a data packet (e.g., a TSN data frame) to the listening device using the ratio architecture of the implementing device via the component interface 200. At block 431, the example KPI calculator 210 determines the time corresponding to when the data packet was sent during the window (e.g., using the example clock 202). At block 432, the example counter 201 increments the successful transmission count. At block 434, the example KPI calculator 210 calculates the Tx delay time based on a start of the window and when the data packet was sent using the example clock 202.

At block 436, the example data packet controller 206 determines if an ACK is received from the listening device at the radio circuitry of the implementing device via the component interface 200 within a threshold duration of time. If the example data packet controller 206 determines that the ACK was received (block 436: YES), control continues to block 444, as further described below.

If the example data packet controller 206 determines that the ACK was not received (block 436: NO), the example schedule controller 204 determines if the protected window has ended (e.g., based on the schedule and the clock 202) (block 438). If the example schedule controller 204 determines that the protected window has not ended (block 438: NO), the example data packet controller 206 causes the radio circuitry of the implementing device (e.g., via the component interface 200) to retransmit the data packet (e.g., the TSN data frame) to the listening device (block 440), and control returns to block 436. If the example schedule controller 204 determines that the protected window has ended (block 438: YES), the example flag generator 208 (FIG. 2) flags the error for the data exchange (block 442) and the example counter 201 increments a failed transmissions count (block 443) and control continues to block 452.

If the example data packet controller 206 determines that the ACK was received (block 436: YES), the example KPI calculator 210 determines if the ACK was received after a retransmission of the data packet or after the first transmission of the data packet (block 444). If the example KPI calculator 210 determines that the ACK was not received after a retransmission of the data packet (block 444: NO), control continues to block 448. If the example KPI calculator 210 determines that the ACK was received after a retransmission of the data packet (block 444: YES), the example counter 201 increments a retransmission count (block 446). At block 448, the example data packet controller 206 determines the ACK reception time using the example clock 202. At block 450, the example KPI calculator 210 calculates the Tx time buffer based on the time when the ACK transmission was received and the end of the protected window (e.g., TxTBuf=TX_Twe−Tx_Tdone). At block 452, the example data packet controller 206 determines if the link performance data and/or KPI data should be transmitted to the example CNC entity 112 and/or any other device (e.g., the example AP 104 when the data collector 110 is implemented in one or more of the STAs 102a, 102b). The example data collector 110 may transmit time buffer data after each data exchange, after a threshold number of data exchanges, when an error was flagged, etc. The decision of when the example data collector 110 is to transmit determined time buffer data may be based on user and/or manufacturer preferences. If the example data packet controller 206 determines that the time buffer data should not be transmitted (block 452: NO), control returns to block 406 of FIG. 4A.

If the example data packet controller 206 determines that the time buffer data should not be transmitted (block 452: YES), the example KPI calculator 210 determines if there are KPI measurements across multiple windows (block 454 of FIG. 4C). As described above, the example data collector 110 may transmit KPI data after each window or after a plurality of windows. Accordingly, Ff the example KPI calculator 210 determines that the KPI measurements are across multiple windows (block 454: YES), the example KPI calculator 210 generates link performance data based on an average and/or a histogram of the KPI measurements across multiple windows (block 456). if the example KPI calculator 210 determines that the KPI measurements are not across multiple windows (block 454: NO), the example KPI calculator 210 generates link performance data based on an average and/or a histogram of the KPI measurements for a single window (block 457). At block 458, the example data aggregator 212 (FIG. 2) determines whether to aggregate KPI data from multiple devices. For example, particular TSN nodes may obtain KPI data from multiple different TSN nodes. In such an example, the data collector 110 may aggregate the data from the multiple TSN nodes to send to the CNC entity 112. If the data aggregator 212 determines that KPI data will not be aggregated from multiple devices (block 458: NO), control continues to block 462. If the data aggregator 212 determines that KPI data will be aggregated from multiple devices (block 458: YES), the example data aggregator 212 generates a report based on aggregated KPI data at the application protocol level (block 460). The aggregated KPI information may include KPI measured locally and KPI received from other TSN nodes. At block 462, the example data packet controller 206 transmits the link performance data (e.g., the KPI data) and/or the report to the CNC entity 112 and/or the AP 104 using the radio circuitry of the implementing device (e.g., via the component interface 200). The KPI data/report data may include KPI measurements, averages, histograms, number of windows measured, flagged errors, and/or any other relevant information corresponding to one or more TSN nodes. The example instructions of FIGS. 4A-4C end.

Figure 5A:
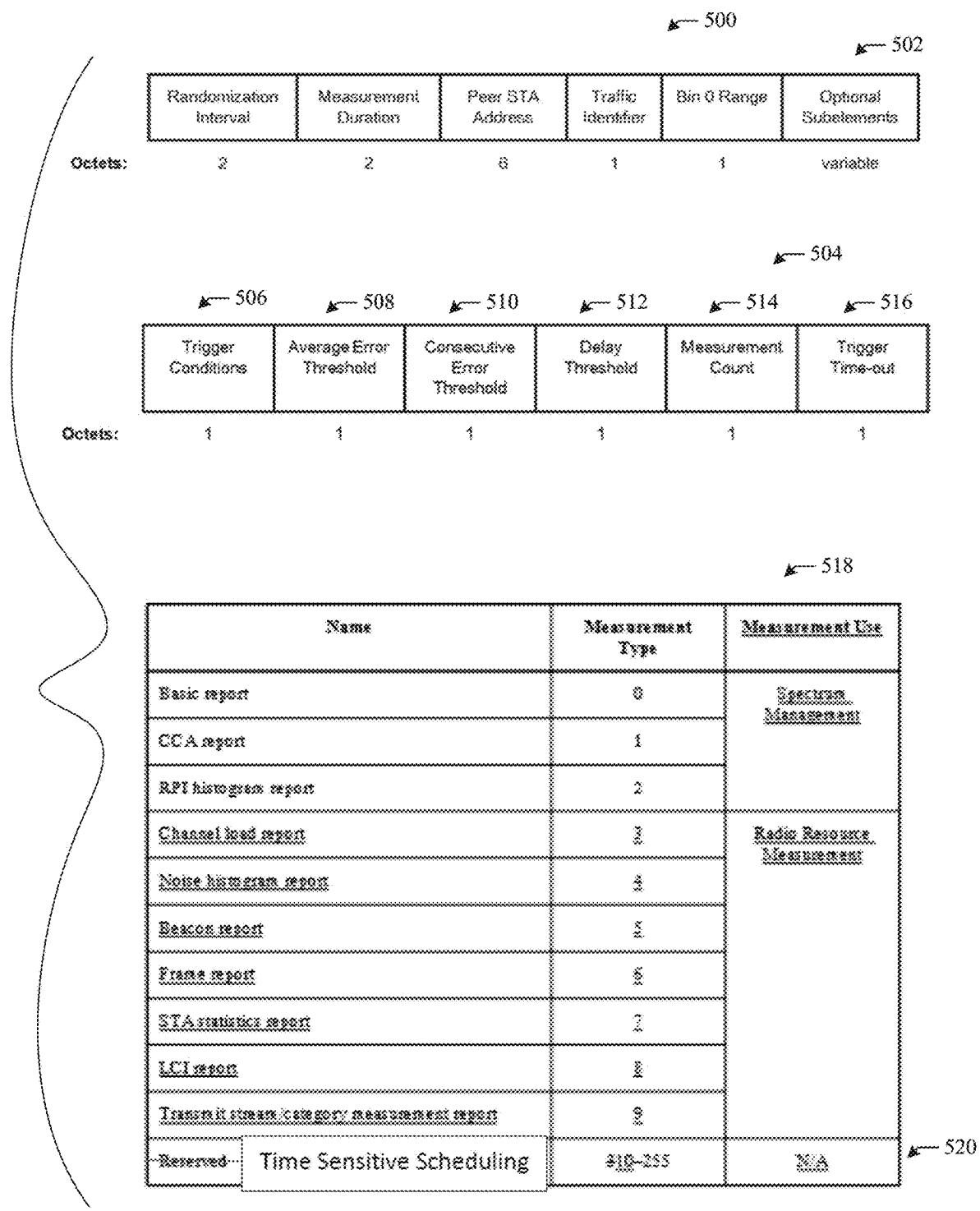
FIGS. 5A and 5B illustrate example data packets and/or element type definitions that may utilized in conjunction with determining link performance.
Figure 5B:
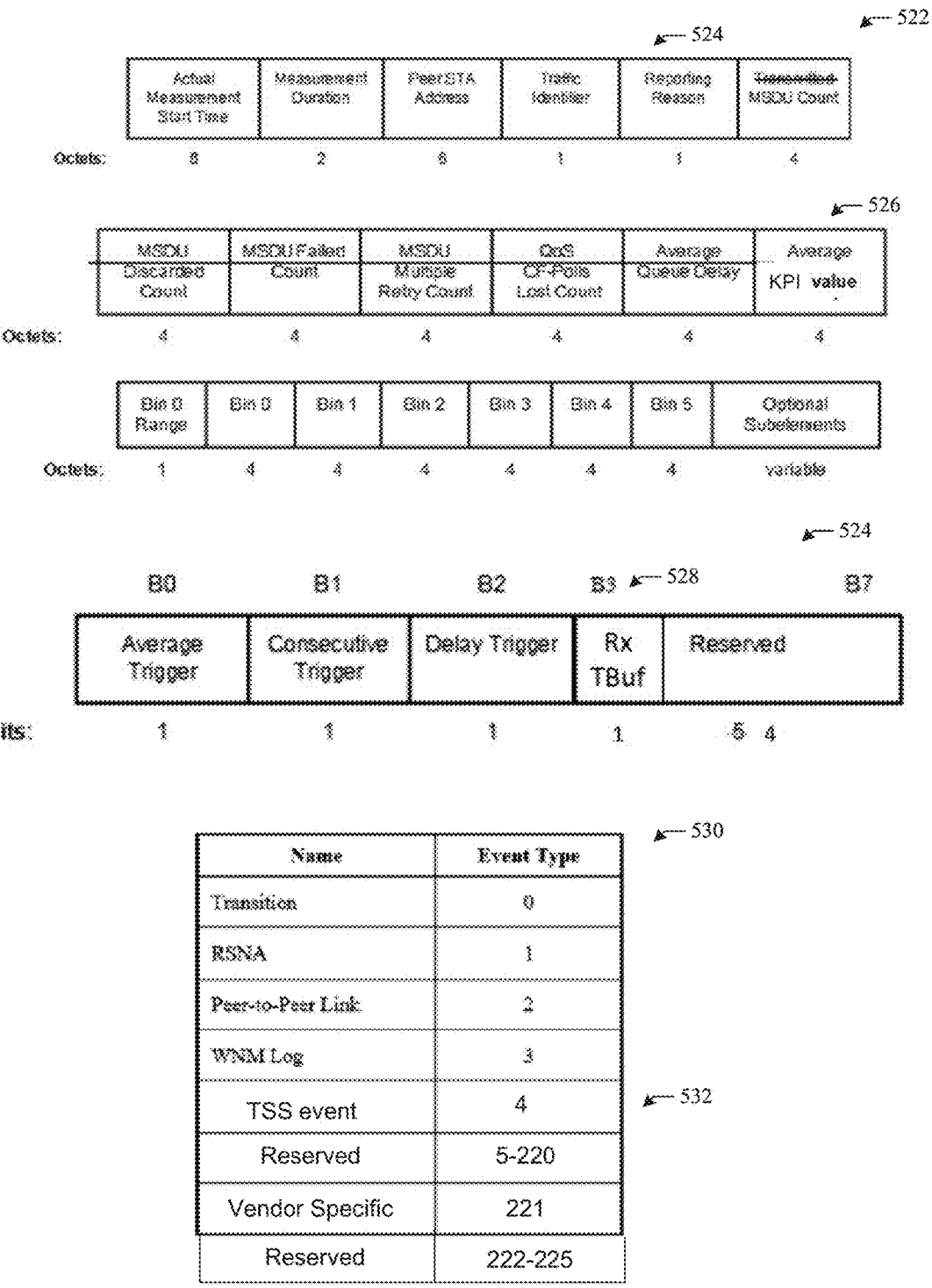

FIGS. 5A and 5B illustrate formats or structures of example data packets (also referred to as elements) and/or element type definitions that may be adjusted from a standard (e.g., a TSN standard) to include data corresponding to the link performance measurements described herein. FIG. 5A includes an example transmit stream/category measurement request element 500 including an example optional sub-element 502, and an example violation indicator and triggered reporting data packet 504. The example violation indicator and triggered reporting data packet 504 includes an example average error threshold sub-element 508, an example consecutive error threshold sub-element 510, an example delay threshold sub-element 512, an example measurement count sub-element 514, and an example trigger time-out sub-element 516. FIG. 5A further includes an example measurement type table 518 including a TSS definition 520. FIG. 5B includes an example transmit stream/category measurement report element 522, an example reporting reason sub-element 524, an example average KPI value sub-element 526, an example Rx KPI sub-element 528, an example event type table 530, and an examples TSS event type field 532. Although FIGS. 5A and 5B include example manners to indicate TSN time sync TSN metrics and/or link performance information, the KPI measurements and link performance information may be indicated in any data packets and/or any configuration.

The example transmit stream/category measurement request element 500 of FIG. 5A includes the example optional sub-elements 502. In some examples, KPI information (e.g., time buffer data, delay time data, adjusted time difference data, queue time data, TSN counts, and/or time sync counts) may be included in the optional sub-elements 502. For example, the optional sub-elements 502 may include a queue time, an adjusted time delay, Tx time buffer reporting field, a Tx time buffer triggered reporting field, an Rx time buffer triggered reporting field, a Rx time buffer reporting field, a Tx time buffer violation indicator reporting field, an Rx time buffer violation indication reporting field, a Tx delay time reporting field, a Tx delay time triggered reporting field, an Rx delay time triggered reporting field, an Rx delay time reporting field, a Tx delay time violation indicator reporting field, an Rx delay violation indication reporting field, and/or TSN and/or time sync counts.

The example violation indicator and triggered reporting data packet 504 of FIG. 5A includes various fields (e.g., sub-elements) corresponding to when a device is to report KPI data. The example trigger conditions sub-element 506 includes a value corresponding to a specific KPI to be transmitted to the CNC entity 112. The example average error threshold sub-element 508 includes a value representing the number of discarded MSDUs to be used as the threshold value for the average trigger conditions. The example consecutive error threshold sub-element 510 includes a value representing the number of discarded MSDUs to be used as the threshold value for a consecutive trigger condition. The example delay threshold sub-element 512 includes a delayed MSDU range (e.g., including a value representing the MSDU transmit delay at or above which an MSDU will be counted towards the delayed MSDU count threshold) and a delayed MSDU count (e.g., includes a value representing a lower bound of a bin in the transmit delay histogram). The example measurement count sub-element 514 includes a number of MSDUs (which may be used to calculate an average discard count of the average trigger condition). The example trigger time-out sub-element 516 includes a value expressed in units of 100 time units (TU), during which a measuring STA will not generate further triggered transmit stream/category measurement reports after a trigger condition has been met.

The example measurement type table 518 of FIG. 5A corresponds to measurement types for measurement reports. Accordingly, the CNC entity 112 can identify the measurement type based on the corresponding value. In the example measurement type table 518, the measurement type for TSS 520 is defined as 10. However, the measurement type may be defined as any number within the table 518.

The example transmit stream/category measurement report element(s) 522 of FIG. 5B includes the example reporting reason filed 524 and the example average KPI value 526 (e.g., which corresponds to one or more of the KPI values). The reporting reason filed 524 includes an example Rx time buffer subfield 528 to include the Rx time buffer. However, the example Rx time buffer subfield 528 can correspond to any one of the KPIs. The example average KPI value 526 includes an average of previously calculated KPIs.

The example event type table 530 includes event types that may be identified in the 802.11v specification. The example event table 530 includes the TSS event type corresponding to "4." In some examples, the TSS event type is included in a TSS event request element and/or a TSS event response element. The TSS event request element may include a traffic identifier and a KPI threshold value. The TSS event response may include the traffic number and a measurement KPI value.

Figure 6:
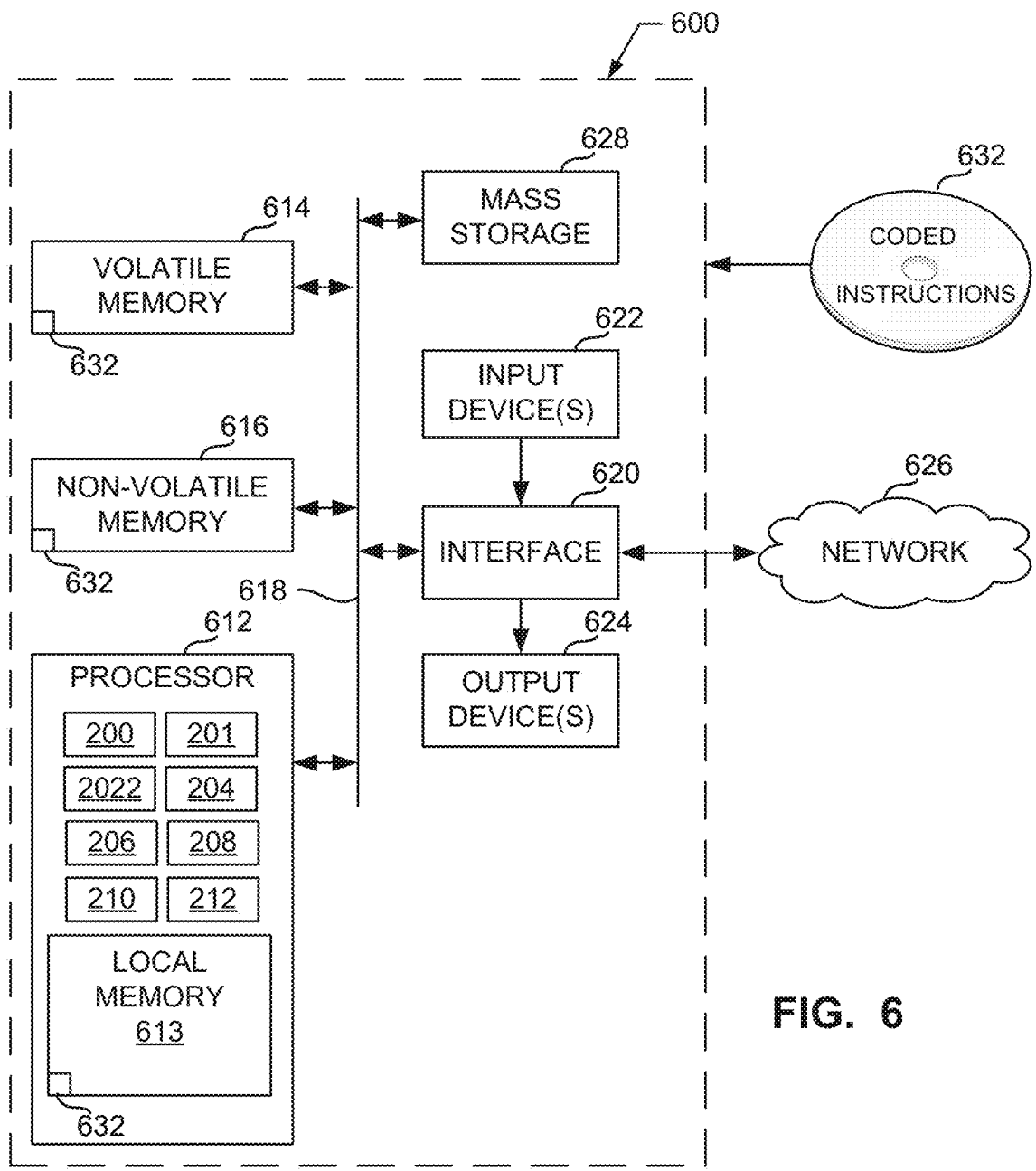
FIG. 6 is a block diagram of an example processing platform structured to execute the instructions of FIGS. 4A-4C to implement the example data collector of FIG. 2.

FIG. 6 is a block diagram of an example processor platform 600 structured to execute the instructions of FIGS. 4A-4C to implement the data collector 110 of FIG. 2. The processor platform 600 can be, for example, a server, a station, a bridge, an access point, a personal computer, a workstation, a self-learning machine (e.g., a neural network), a mobile device (e.g., a cell phone, a smart phone, a tablet such as an iPad'), a personal digital assistant (PDA), an Internet appliance, a gaming console, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the component interface 200, the example counter 201, the clock 202, the schedule controller 204, the data packet controller 206, the flag generator 208, the KPI calculator 210, and the example data aggregator 212 of FIG. 2.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4A-4C may be stored in the mass storage device 628, in the volatile memory 614, in the non-volatile memory 616, and/or on a removable non-transitory computer readable storage medium such as a CD or DVD.

Figure 7:
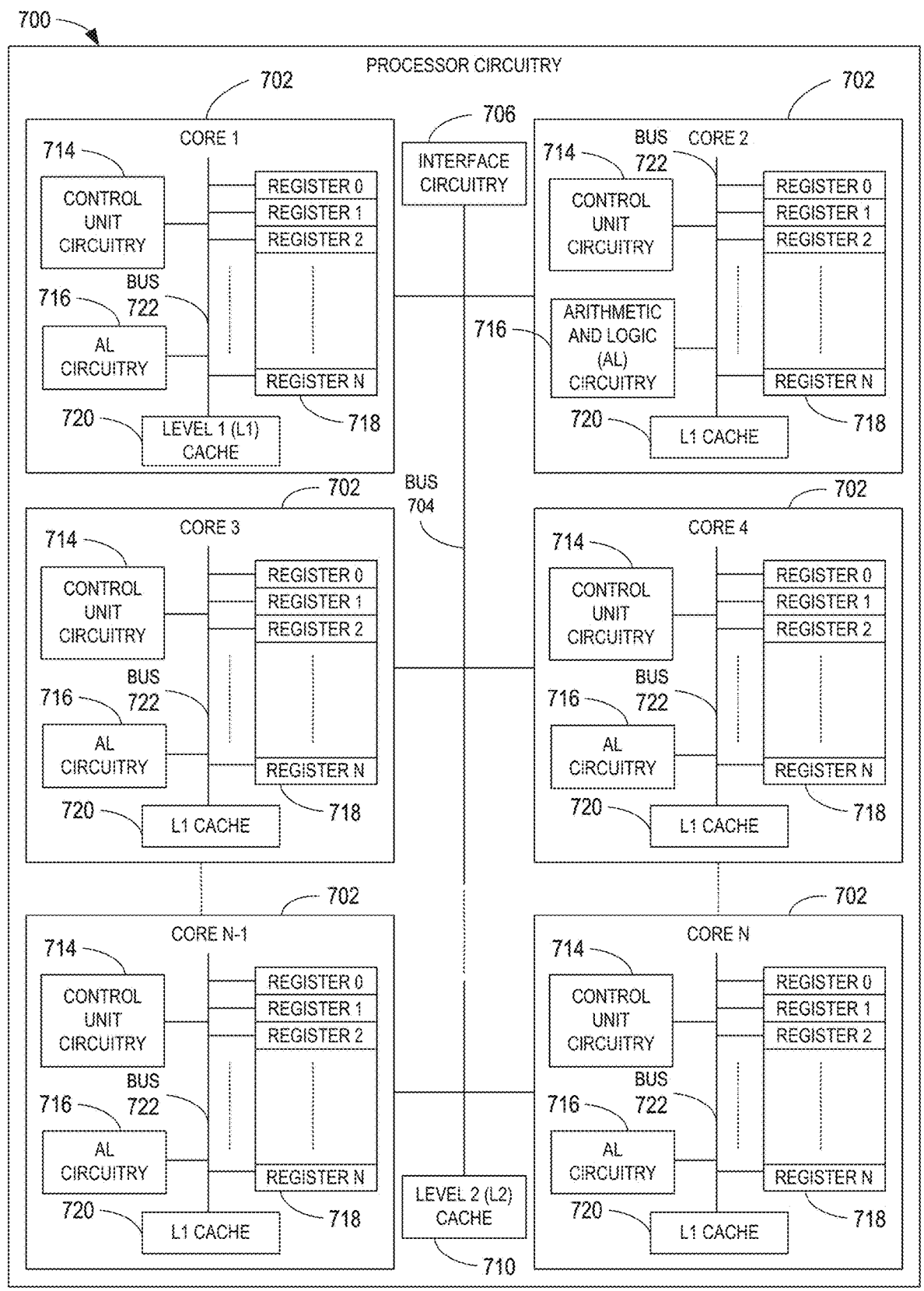
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a general purpose microprocessor 700. The general purpose microprocessor circuitry 700 executes some or all of the machine readable instructions of the flowchart of FIGS. 4A-4C. to effectively instantiate the data collector 110 of FIG. 2 as logic circuits to perform the operations corresponding to those machine readable instructions. In some such examples, the circuitry of FIG. 2 is instantiated by the hardware circuits of the microprocessor 700 in combination with the instructions. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIGS. 4A-4C.

The cores 702 may communicate by a first example bus 704. In some examples, the first bus 704 may implement a communication bus to effectuate communication associated with one(s) of the cores 702. For example, the first bus 704 may implement at least one of an Inter-Integrated Circuit (I2C) bus, a Serial Peripheral Interface (SPI) bus, a PCI bus, or a PCIe bus. Additionally or alternatively, the first bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_ cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
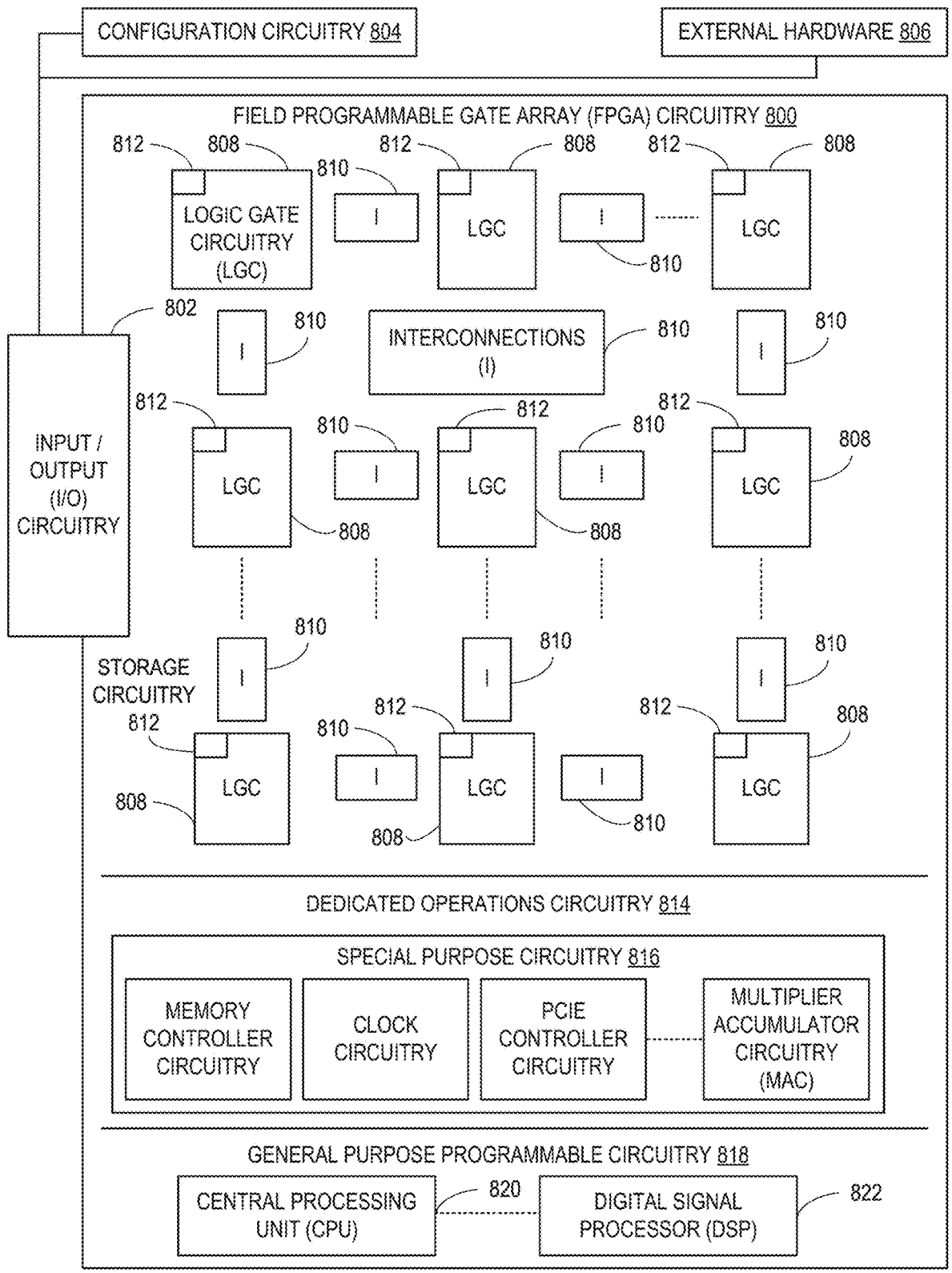
FIG. 8 is a block diagram of another example implementation of the processor circuitry of FIG. 6.
Figure 9:
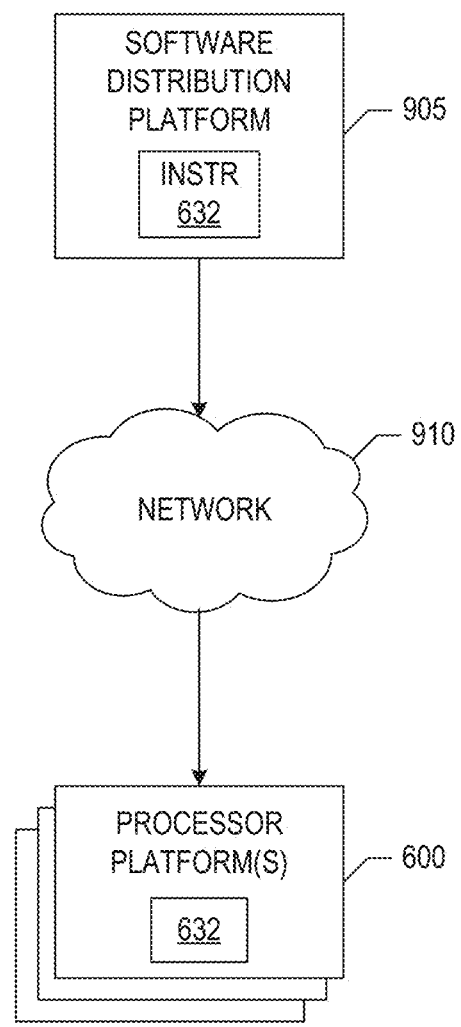
FIG. 9 is a block diagram of an example software distribution platform (e.g., one or more servers) to distribute software (e.g., software corresponding to the example machine readable instructions of FIGS. 4A-4C to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIGS. 4A-4C but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIGS. 4A-4C. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIGS. 4A-4C. As such, the FPGA circuitry 800 may be structured to effectively instantiate some or all of the machine readable instructions of the flowchart of FIGS. 4A-4C as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 4A-4C faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry

804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIGS. 4A-4C and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIGS. 4A-4C may be executed by one or more of the cores 702 of FIG. 7, a second portion of the machine readable instructions represented by the flowchart of FIGS. 4A-4C may be executed by the FPGA circuitry 800 of FIG. 8, and/or a third portion of the machine readable instructions represented by the flowchart of FIGS. 4A-4C may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

A block diagram illustrating an example software distribution platform 905 to distribute software such as the example machine readable instructions 632 of FIG. 6 to hardware devices owned and/or operated by third parties is illustrated in FIG. 2. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sublicensing. In the illustrated example, the software distribution platform 905 includes one or more servers and one or more storage devices. The storage devices store the machine readable instructions 632, which may correspond to the example machine readable instructions 400 of FIGS. 4A-4C as described above. The one or more servers of the example software distribution platform 905 are in communication with a network 910, which may correspond to any one or more of the Internet and/or any of the example network 106 of FIG. 1. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 400 of FIGS. 4A-4C, may be downloaded to the example processor platform 600, which is to execute the machine readable instructions 632 to implement the data collector 110 of FIGS. 1 and 2. In some example, one or more servers of the software distribution platform 905 periodically offer, transmit, and/or force updates to the software (e.g., the example machine readable instructions 632 of FIGS. 4A-4C) to ensure improvements, patches, updates, etc., are distributed and applied to the software at the end user devices.

From the foregoing, it will be appreciated that example methods, apparatus and articles of manufacture have been disclosed that provide performance measurements in time-sensitive networks. The disclosed methods, apparatus and articles of manufacture measure KPI data to adjust a TSN data exchange schedule to improve performance and/or increase efficiency. The disclosed methods, apparatus and articles of manufacture are accordingly directed to one or more improvement(s) in the functioning of a computer.

Example methods, apparatus, systems, and articles of manufacture to provide performance measurements in time-sensitive networks are disclosed herein. Further examples and combinations thereof include the following: Example 1 includes an apparatus comprising processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate schedule control circuitry to determine a first time corresponding to a start of a window for a data exchange, data packet control circuitry to determine a second time corresponding to a data packet sent during the window, key performance indicator calculation circuitry to calculate link performance data based on the first time and the second time, and interface circuitry to transmit the link performance data to a network configuration entity.

Example 2 includes the apparatus of example 1, wherein the schedule control circuitry is to determine the first time based on a previously obtained global schedule.

Example 3 includes the apparatus of example 1, wherein the interface circuitry is to transmit the data packet during the window, the data packet is stored in a queue prior to the interface circuitry transmitting the data packet.

Example 4 includes the apparatus of example 3, wherein the key performance indicator calculation circuitry is to include an amount of time the data packet was stored in the queue in the link performance data.

Example 5 includes the apparatus of example 1, further including a flag generator to generate a flag indicative of an error when at least one of an acknowledgement is not received within the window, the acknowledgement is not transmitted within the window, or a data frame is not obtained within the window.

Example 6 includes the apparatus of example 1, wherein the key performance indicator calculation circuitry is to calculate the link performance data based on a difference between the second time and the first time.

Example 7 includes the apparatus of example 1, wherein the interface circuitry is to transmit the link performance data to the network configuration entity to at least one of mitigate an error or adjust a length of the window to increase performance or efficiency.

Example 8 includes the apparatus of example 1, wherein the key performance indicator calculation circuitry is to determine a difference between a primary clock of an access point and a secondary local clock, and include the difference in the link performance data.

Example 9 includes the apparatus of example 1, wherein the window is reserved for at least one of time sensitive network frames or time synchronization frames, further including a counter to generate a count of an event that has occurred during the window, the key performance indicator calculation circuitry to include the count in the link performance data.

Example 10 includes the apparatus of example 9, wherein the event corresponds to at least one of a successful transmission, a successful reception, a successful retransmission, or a failure to transmit.

Example 11 includes the apparatus of example 1, wherein the link performance data is first link performance data, further including data aggregation circuitry to aggregate the first link performance data with second link performance data from an external device.

Example 12 includes a non-transitory computer readable medium comprising instructions which, when executed, cause one or more processors to at least determine a first time corresponding to a start of a window for a data exchange, determine a second time corresponding to a data packet sent during the window, calculate link performance data based on the first time and the second time, and transmit the link performance data to a network configuration entity.

Example 13 includes the computer readable medium of example 12, wherein the instructions cause the one or more processors to determine the first time based on a previously obtained global schedule.

Example 14 includes the computer readable medium of example 12, wherein the instructions cause the one or more processors to transmit the data packet during the window, the data packet is stored in a queue prior to transmitting the data packet.

Example 15 includes the computer readable medium of example 14, wherein the instructions cause the one or more processors to include an amount of time the data packet was stored in the queue in the link performance data.

Example 16 includes the computer readable medium of example 12, wherein the instructions cause the one or more processors to generate a flag indicative of an error when at least one of an acknowledgement is not received within the window, the acknowledgement is not transmitted within the window, or a data frame is not obtained within the window.

Example 17 includes the computer readable medium of example 12, wherein the instructions cause the one or more processors to calculate the link performance data based on a difference between the second time and the first time.

Example 18 includes the computer readable medium of example 12, wherein the instructions cause the one or more processors to transmit the link performance data to the network configuration entity to at least one of mitigate an error or adjust a length of the window to increase performance or efficiency.

Example 19 includes the computer readable medium of example 12, wherein the instructions cause the one or more processors to determine a difference between a primary clock of an access point and a secondary local clock, and include the difference in the link performance data.

Example 20 includes the computer readable medium of example 12, wherein the window is reserved for at least one of time sensitive network frames or time synchronization frames, the instructions to cause the one or more processors to generate a count of an event that has occurred during the window, and include the count in the link performance data.

Example 21 includes the computer readable medium of example 20, wherein the event corresponds to at least one of a successful transmission, a successful reception, a successful retransmission, or a failure to transmit.

Example 22 includes the computer readable medium of example 12, wherein the link performance data is first link performance data, the instructions to cause the one or more processors to aggregate the first link performance data with second link performance data from an external device.

Example 23 includes an apparatus comprising means for determining a first time corresponding to a start of a window for a data exchange, means for determining a second time corresponding to a data packet sent during the window, means for calculating link performance data based on the first time and the second time, and means for transmitting the link performance data to a network configuration entity.

Example 24 includes the apparatus of example 23, wherein the means for determining the first time is to determine the first time based on a previously obtained global schedule.

Example 25 includes the apparatus of example 23, wherein the means for transmitting is to transmit the data packet during the window, the data packet is stored in a queue prior to transmitting the data packet.

Example 26 includes the apparatus of example 25, wherein the means for calculating is to include an amount of time the data packet was stored in the queue in the link performance data.

Example 27 includes the apparatus of example 23, further including means for generating a flag indicative of an error when at least one of an acknowledgement is not received within the window, the acknowledgement is not transmitted within the window, or a data frame is not obtained within the window.

Example 28 includes the apparatus of example 23, wherein the means for calculating is to calculate the link performance data based on a difference between the second time and the first time.

Example 29 includes the apparatus of example 23, wherein the means for transmitting is to transmit the link performance data to the network configuration entity to at least one of mitigate an error or adjust a length of the window to increase performance or efficiency.

Example 30 includes the apparatus of example 23, wherein the means for calculating is to determine a difference between a primary clock of an access point and a secondary local clock, and include the difference in the link performance data.

Example 31 includes the apparatus of example 23, wherein the window is reserved for at least one of time sensitive network frames or time synchronization frames, further including means for generating a count of an event that has occurred during the window, the means for calculating to include the count in the link performance data.

Example 32 includes the apparatus of example 31, wherein the event corresponds to at least one of a successful transmission, a successful reception, a successful retransmission, or a failure to transmit.

Example 33 includes the apparatus of example 23, wherein the link performance data is first link performance data, further including means for aggregating the first link performance data with second link performance data from an external device.

Example 34 includes a method comprising determining a first time corresponding to a start of a window for a data exchange, determining a second time corresponding to a data packet sent during the window, calculating link performance data based on the first time and the second time, and transmitting the link performance data to a network configuration entity.

Example 35 includes the method of example 34, further including determining the first time based on a previously obtained global schedule.

Example 36 includes the method of example 34, further including transmitting the data packet during the window, the data packet is stored in a queue prior to transmitting the data packet.

Example 37 includes the method of example 36, further including determining an amount of time the data packet was stored in the queue in the link performance data.

Example 38 includes the method of example 34, further including generating a flag indicative of an error when at least one of an acknowledgement is not received within the window, the acknowledgement is not transmitted within the window, or a data frame is not obtained within the window.

Example 39 includes the method of example 34, further including calculating the link performance data based on a difference between the second time and the first time.

Example 40 includes the method of example 34, wherein the transmitting of the link performance data includes transmitting the link performance data to the network configuration entity to at least one of mitigate an error or adjust a length of the window to increase performance or efficiency.

Example 41 includes the method of example 34, further including determining a difference between a primary clock of an access point and a secondary local clock, and including the difference in the link performance data.

Example 42 includes the method of example 34, wherein the window is reserved for at least one of time sensitive network frames or time synchronization frames, further including generating a count of an event that has occurred during the window, and calculating to include the count in the link performance data.

Example 43 includes the method of example 42, wherein the event corresponds to at least one of a successful transmission, a successful reception, a successful retransmission, or a failure to transmit.

Example 44 includes the method of example 34, wherein the link performance data is first link performance data, further including aggregating the first link performance data with second link performance data from an external device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    interface circuitry to transmit a data packet after the start of a window for a data exchange;
    machine readable instructions;
    programmable circuitry to at least one of instantiate or execute the machine readable instructions to:
        determine a first time corresponding to the start of the window for the data exchange;
        determine a second time corresponding to the data packet sent during the window;
        calculate a transmitter delay time based on the first time and the second time; and
    cause transmission of link performance data to a network configuration entity, the link performance data including the transmitter delay time.

2. The apparatus of claim 1, wherein the programmable circuitry is to determine the first time based on a previously obtained global schedule.

3. The apparatus of claim 1, wherein the data packet is stored in a queue prior to the interface circuitry transmitting the data packet.

4. The apparatus of claim 3, wherein the programmable circuitry is to include an amount of time the data packet was stored in the queue in the link performance data.

5. The apparatus of claim 1, wherein the programmable circuitry is to generate a flag indicative of an error when at least one of an acknowledgement is not received within the window, the acknowledgement is not transmitted within the window, or a data frame is not obtained within the window.

6. The apparatus of claim 1, wherein the programmable circuitry is to calculate the link performance data based on a difference between the second time and the first time.

7. The apparatus of claim 1, wherein the interface circuitry is to transmit the link performance data to the network configuration entity to at least one of mitigate an error or adjust a length of the window to increase performance or efficiency.

8. The apparatus of claim 1, wherein the programmable circuitry is to:
    determine a difference between a primary clock of an access point and a secondary local clock; and
    include the difference in the link performance data.

9. The apparatus of claim 1, wherein the window is reserved for at least one of time sensitive network frames or time synchronization frames, the programmable circuitry to generate a count of an event that has occurred during the window and include the count in the link performance data.

10. The apparatus of claim 9, wherein the event corresponds to at least one of a successful transmission, a successful reception, a successful retransmission, or a failure to transmit.

11. The apparatus of claim 1, wherein the link performance data is first link performance data, the programmable circuitry to aggregate the first link performance data with second link performance data from an external device.

12. A non-transitory computer readable medium comprising instructions to cause at least one programmable circuitry to at least:
    determine a first time corresponding to a start of a window for a data exchange;
    determine a second time corresponding to a data packet sent during the window;
    calculate a transmitter delay time based on the first time and the second time; and
    cause transmission of link performance data to a network configuration entity, the link performance data including the transmitter delay time.

13. The computer readable medium of claim 12, wherein the instructions cause the at least one programmable circuitry to determine the first time based on a previously obtained global schedule.

14. The computer readable medium of claim 12, wherein the instructions cause the at least one programmable circuitry to case transmission of the data packet during the window, the data packet is stored in a queue prior to transmitting the data packet.

15. The computer readable medium of claim 14, wherein the instructions cause the at least one programmable circuitry to include an amount of time the data packet was stored in the queue in the link performance data.

16. The computer readable medium of claim 12, wherein the instructions cause the at least one programmable circuitry to generate a flag indicative of an error when at least one of an acknowledgement is not received within the window, the acknowledgement is not transmitted within the window, or a data frame is not obtained within the window.

17. The computer readable medium of claim 12, wherein the instructions cause the at least one programmable circuitry to calculate the link performance data based on a difference between the second time and the first time.

18. The computer readable medium of claim 12, wherein the instructions cause the at least one programmable circuitry to cause the transmission of the link performance data to the network configuration entity to at least one of mitigate an error or adjust a length of the window to increase performance or efficiency.

19. The computer readable medium of claim 12, wherein the instructions cause the at least one programmable circuitry to:
    determine a difference between a primary clock of an access point and a secondary local clock; and
    include the difference in the link performance data.

20. The computer readable medium of claim 12, wherein the window is reserved for at least one of time sensitive network frames or time synchronization frames, the instructions to cause the at least one programmable circuitry to:
    generate a count of an event that has occurred during the window, the event corresponding to at least one of a successful transmission, a successful reception, a successful retransmission, or a failure to transmit; and
    include the count in the link performance data.

21. The computer readable medium of claim 12, wherein the link performance data is first link performance data, the instructions to cause the at least one programmable circuitry to aggregate the first link performance data with second link performance data from an external device.

22. A method comprising:
    determining, by executing an instruction with at least one programmable circuitry, a first time corresponding to a start of a window for a data exchange;
    determining, by executing an instruction with the at least one programmable circuitry, a second time corresponding to a data packet sent during the window;
    calculating, by executing an instruction with the at least one programmable circuitry, a transmitter delay time based on the first time and the second time; and
    transmitting link performance data to a network configuration entity, link performance data including the transmitter delay time.

23. The method of claim 22, further including determining the first time based on a previously obtained global schedule.

24. The method of claim 22, further including transmitting the data packet during the window, the data packet is stored in a queue prior to transmitting the data packet.

25. The apparatus of claim 1, wherein the second time is a time at which the interface circuitry transmits the data packet, the time being after the start of the window, the window being a scheduled window for the data exchange.

* * * * *